Figure 4:
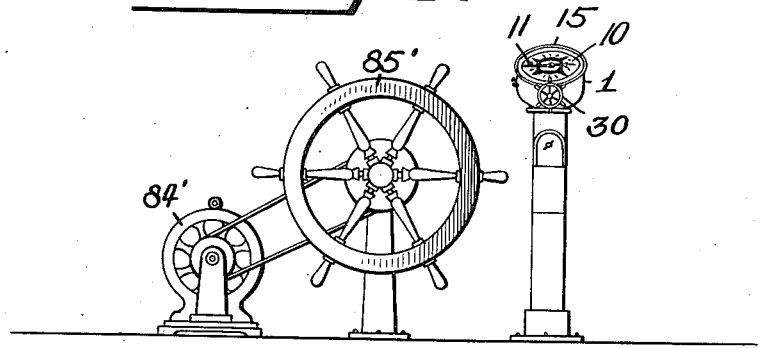

April 20, 1926.
O. B. WHITAKER
AUTOMATIC STEERING DEVICE
Filed Dec. 28, 1923    2 Sheets-Sheet 1
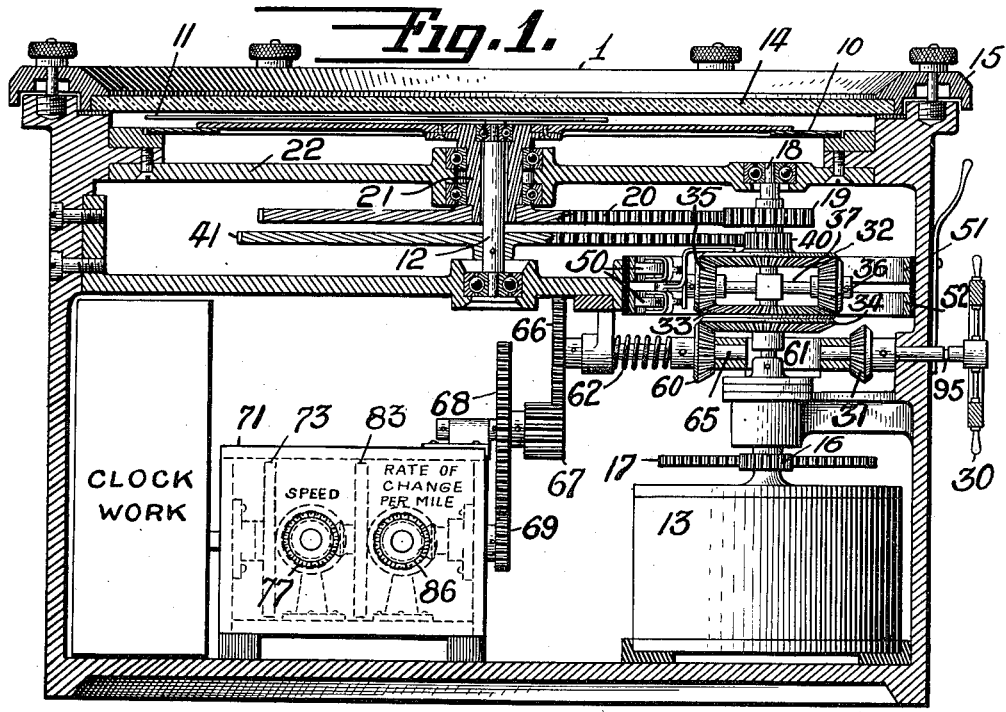
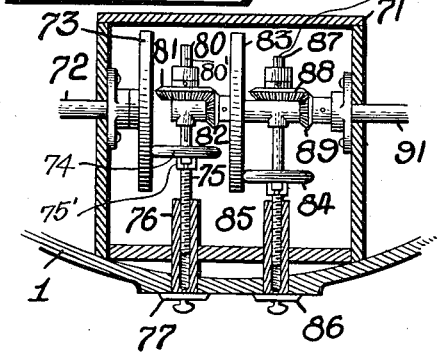
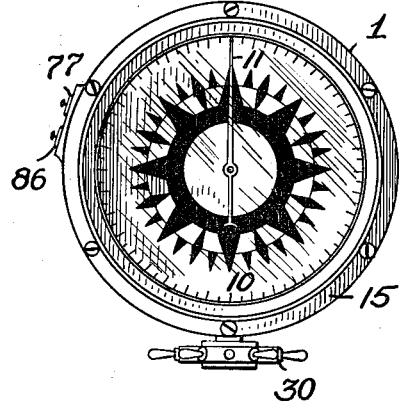
Inventor
Omar B. Whitaker.
By his Attorney
Herbert H. Thompson April 20, 1926.

O. B. WHITAKER 1,581,147

AUTOMATIC STEERING DEVICE

Filed Dec. 28, 1923  2 Sheets-Sheet 2

Inventor
Omar B. Whitaker.
By his Attorney
Herbert H. Thompson

Patented Apr. 20, 1926.

1,581,147

UNITED STATES PATENT OFFICE.

OMAR B. WHITAKER, OF BROOKLYN, NEW YORK, ASSIGNOR TO THE SPERRY GYROSCOPE COMPANY, OF BROOKLYN, NEW YORK, A CORPORATION OF NEW YORK.

AUTOMATIC STEERING DEVICE.

Application filed December 28, 1923. Serial No. 683,141.

*To all whom it may concern:*

Be it known that I, OMAR B. WHITAKER, a citizen of the United States of America, residing at 45 McDonough St., Brooklyn, in the county of Kings and State of New York, have invented certain new and useful Improvements in Automatic Steering Devices, of which the following is a specification.

This invention relates to an automatic steering device for ships or other dirigible vehicles, which may be of the type shown in the patent to E. A. Sperry, #1,360,694 of Nov. 30, 1920, the application of Chester B. Mills, Serial #569,295, filed June 16, 1922, and in the application of Elmer A. Sperry, Jr., Serial #573,280, filed June 30, 1922. These devices have for their object to maintain a vessel automatically upon a given course and are further provided with means whereby a new course may be set and the vessel automatically directed into said new course.

This invention has for its principal object not only the provision of means for automatically maintaining the vessel upon a given course but the provision of means for automatically maintaining a vessel upon the shortest possible course whether that course be curved or straight. Ships do not ordinarily follow a straight course between the point of departure and point of destination, even if it is possible to do so, because it is well known that such a course, usually called the Mercator course, is not usually the shortest distance between the said two points. The shortest distance between two points on a sphere is not the direct line of bearing from one to the other except in certain special cases, but rather the arc of a great circle passing through those points, since on the sphere the arc of a great circle corresponds to the straight line in the plane.

Where the point of departure and the point of destination are a substantial number of degrees of longitude apart or where said points are in high north or south latitudes or where solid land is intercepted, it is sometimes not feasible to follow the arc of a great circle through these points, since said arc may extend too far north or south. An arc of somewhat lesser curvature is, therefore, frequently followed or a combination of arcs of various degrees of curvature or of Mercator and great circle sailing, may be resorted to. My invention has for its further object the provision of means whereby an arc of any desired degree of curvature may be followed automatically by the vessel.

Other objects and advantages of this invention, more or less broad than those hereinbefore stated, will be in part specifically referred to and in part obvious from the following description of the invention.

In the accompanying drawings—

Fig. 1—is a vertical section through an automatic steering controller embodying my invention.

Fig. 2—is a horizontal section through the adjusting device.

Fig. 3—is a plan view of the Fig 1 device.

Fig. 4—is a front elevation of a steering wheel and motor drive therefore controlled by the device of Figs. 1 and 2.

Figure 5:
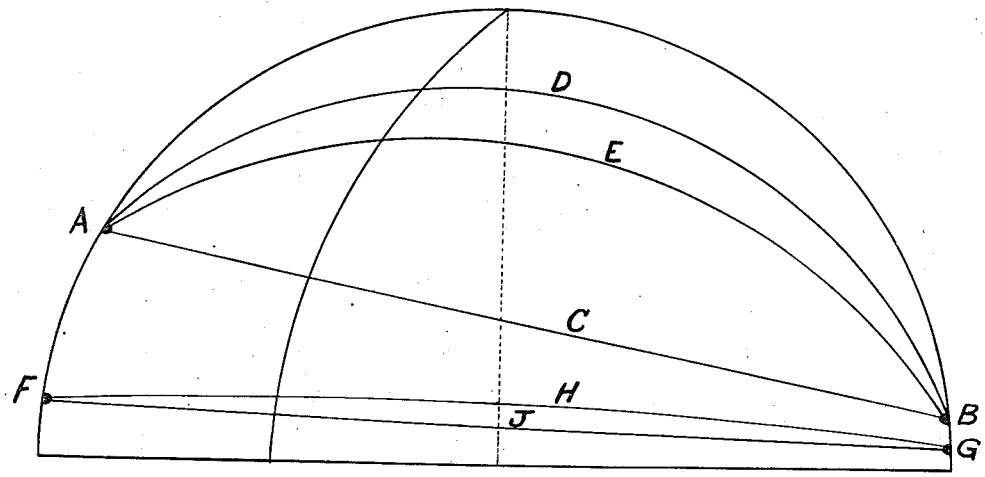

Fig. 5—is a diagrammatic representation of the principle involved in this invention.

Referring to Fig. 1 of the drawings, there is shown a master controller indicated generally at 1 and positioned preferably in the pilot house of a dirigible craft and from which the rudder is automatically controlled.

The system of course-control by the mechanism of Fig. 1 is in part set forth and claimed in the above named co-pending applications of Chester B. Mills and Elmer A. Sperry, Jr., to which reference should be had for a more complete description. A brief description of this device, however, may be given here as follows:

Said master controller performs the functions both of a steering repeater compass and a master controller, the standard repeater compass card 10 cooperating with the settable course indicator 11. The indicator or pointer 11, is mounted upon a shaft 12 concentric with the compass card 10 and controlled from a repeater motor 13 actuated from a master compass (not shown). The entire mechanism is enclosed in a casing, having the usual glass cover 14 and bezel 15. The card is rotated by the motor 13 through gears 16 and 17 to rotate shaft 18 and gear 19 thereon, gear 19 meshing with gear 20 on a bushing 21 journaled in a partition plate 22, said card being fixed to the upper end of said bushing.

To set pointer 11 relative to the repeater card a handle 30 may be provided which operates by means of bevel gear 31, a differential comprising upper gear 32 and lower gears 33 and 34 meshing with gears 35 and 36 of a planetary member 37 fixed to shaft 18. Since shaft 18 is rotated by the repeater motor, operation of handle 30 will rotate gears 35 and 36 about their axes to rotate gears 32 and 40 fixed thereto, said gear 40 meshing with gear 41 fixed to the pointer shaft 12. Fixed to gear 32 is a trolley 50 meshing with contact strips 51 and 52, arranged in the form of rings, each ring being divided into two semi-circular portions separated by insulator strips. It will be obvious that when a new course is set by handle 30, or when the ship turns off its course so that trolley 50 is rotated by the repeater motor along the contact strips 51 and 52, the circuit is closed through one field or the other of a reversible motor 84', which is geared to the steering wheel 85' in a suitable manner as by a chain and sprocket, as shown in Fig. 4. In this manner the rudder is actuated in such a direction as to bring the vessel back to its course or into the new course, if a new course has been set by handle 30, whereupon trolley 50 again rests upon the insulator strips.

The invention as described thus far, does not differ from the invention disclosed in the said patent applications of Chester B. Mills and Elmer A. Sperry, Jr. My improved controller, forming the subject of this invention, combines with the hereinbefore described structure means for automatically causing the vessel to follow the arc of a great circle or to follow an arc of any other desired degree of curvature.

Referring to the diagram in Fig. 5, it will be seen that a vessel desiring to travel from point of departure A to point of destination B, may travel the Mercator course C, which is the direct bearing from point A to point B, or the vessel may travel the arc of a great circle D, which is a very much shorter route. Where the points A and B are spaced far apart, in degrees of longitude, or where said points are in high north or south latitude, or where land would otherwise be encountered, it may be found that the arc of a great circle, such as D, cannot conveniently be followed. Under such conditions, it may be more desirable to follow a curve of a lesser degree of curvature, such as E.

As is well known, the saving in distance which is effected by following the arc of a great circle instead of the Mercator course, varies with the distance of the points of departure and destination from the equator, for it is obvious from Fig. 5, that if a course is followed between points F and G, which are near the equator, that the arc H of the great circle passing through these points, does not differ substantially from the Mercator course J, but that as the latitude increases the difference becomes more marked and the degree of curvature is greater. That is to say, for any given unit of distance, the change of course of the vessel is greater as the latitude increases, or, stating it differently, the number of miles which must be traversed for each change in course of 1° decreases as the latitude increases.

The change of course for any given unit of distance depends not only upon the latitude but also upon the number of degrees of longitude between the two points. Obviously if the two points are on a N—S line, M, i. e., a meridian, they are on a great circle which is the shortest distance between them and no change of course is required. As the points are spaced apart longitudinally, however, the saving effected by great circle sailing increases, as does also the change in course per unit distance,—reaching a maximum when the points are 180° apart. It is apparent, therefore, that the change of course per unit of distance depends (1) upon the latitude, and (2) upon the E—W component of the course of the vessel.

It is obvious that to follow the arc of a great circle requires either continuous change of course to affect a true arc or periodic changes of course as shown at E and which is in effect a polygonal course. In either case the course must be changed constantly or else the vessel will strike off on a course tangent to the curve. The degree of change, whether said change is continuous or intermittent, will vary with the latitude and course, as above pointed out. The rate of change of course per mile of travel can be figured out in advance for any desired course, so that if course is changed after a given unit of distance, say 100 miles, this degree of change may be applied each time or the rate of change per mile may be affected continuously by applying a continuous course changing means.

I have shown in the accompanying drawings one form of this invention whereby the vessel is caused to follow the arc of a great circle or any other desired arc automatically. I provide means for introducing this change of course through the same gear 34 of the differential as is employed when changing course by handle 30 and gear 31. For this purpose I mount both gear 31 and gear 60 in a frame 61 at opposite sides of gear 34 and so spaced that only one of said gears 31—60 mesh with gear 34 at a time so that when the hand controlled course-changing device is effective the automatic course-changing device is ineffective and vice versa. The frame 61 is normally spring pressed by a spring 62 to render gear 60 effective and gear 31 ineffective. Gear 60 is mounted upon a shaft 65 which is driven through suitable reduction gearing 66, 67, 68, 69 from a source of power which, in the present instance, is a clockwork 70, driving at a constant speed.

Since the change of course in any given interval of time is dependent upon the distance traveled, multiplied by the rate of change of course per unit distance (which is dependent upon the latitude and course), I interpose means between the clockwork 70 and the gear 60 for varying the rate of movement of gear 60, in accordance with the distance traveled and the rate of change of course per unit distance. For this purpose I provide an adjustment box or device 71 into which the operating shaft 72 of the clockwork 70 extends, said shaft 72 having fixed thereto a disc 73 with which meshes a friction disc 74 fixed upon a shaft 80 and operable toward or away from the center of disc 73 by means of an internally threaded cylinder 76 into which a threaded stem 75 fits, said stem being swivelled to said shaft 80 as at 75'. Said cylinder 76 extends to the outside of the casing 71 and is provided with a suitable knob and dial 77. Dial 77 is calibrated in terms of speed, since the clockwork 70 supplies the time factor, and the time multiplied by the speed gives a function of the distance traveled.

The shaft 80 of friction disc 74 is splined as at 80' to bevel gear 81 which meshes with gear 82 driving a second disc 83 which is therefore driven in accordance with a function of the distance traveled. Cooperating with disc 83 is a friction disc 84 operated toward or away from the center of a disc 83 by a cylinder 85, having a knob and dial 86 similar to 77. Said dial 86 is calibrated in turns of degrees change of course per mile (or other unit of distance) which multiplied by the number of miles traveled gives the total change of course transmitted through trolleys 50. The shaft 87 of disc 84 is suitably geared by gears 88 to drive a gear 89 whose rate of movement is therefore a function of both the distance traveled and the degrees of change per unit distance. Gear 89 therefore transmits a function of the total change of course to be effected through trolleys 50. The shaft 91 of gear 89 may carry the gear 69 which meshes with the train of gears effective to drive gear 60.

In operation the speed and change of course in degrees per unit distance being determined and suitably set by means of the dials 77 and 86, the trolley 50 will be moved continuously in the proper direction and at the proper rate to cause the ship to change its course continuously and thus follow the arc desired. It will, of course, be understood that the rate of change of course will determine the curve which the ship travels. Further it may be desired to abandon the great circle of course for a time and follow a Mercator course. For this purpose, handle 30 may be moved inwardly part way so that both gears 31 and 60 are out of mesh with gear 34, the system being held in said position by means of spring pressed detents engaging in a suitable groove in the shaft 95 which carries handle 30. Or the course may be laid out to follow curves of two or more different degrees of curvature, in which case dial 86 would be set at the beginning of each curve, the device operating to maintain the craft on that curve until the course is changed by resetting dial 86.

Where a course such as D or E is to be followed there may be employed instead of the continuous drive shown an intermittent drive adapted to operate at predetermined intervals, such as 100 miles. Such a device is preferably tied up with the hundreds wheel of a distance indicator so that each time the hundreds wheel is actuated through one step, the course-changing mechanism is operated through gearing which may include a variable gear, as shown herein, for varying the degree of change of course per hundred miles.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Claims:

1. In an automatic steering device for dirigible craft, means for repeatedly setting a new course, means for moving the craft into said course, and means for automatically operating said first means in accordance with the latitude and course of the craft.

2. In an automatic steering device for dirigible craft, means for repeatedly setting a new course, means for moving the craft into said course, and means for automatically operating said first means in accordance with the latitude, course and speed of said craft.

3. In an automatic steering device for ships or other passenger carrying dirigible craft, the combination with means for maintaining the ship on its course, means for setting a new course, means for moving the craft into said course, and means for continuously operating said first means in accordance with the speed of said craft to change the course by increments.

4. In an automatic steering device for dirigible craft, means for setting a new course, means for moving the craft into said course, and means for continuously operating said first means in accordance with the latitude and course of said craft.

5. In an automatic steering device for dirigible craft, means for setting a new course, means for moving the craft into said course, and means for continuously operating said first means in accordance with the latitude, course and speed of said craft.

6. In an automatic steering device for ships or other dirigible craft, means for setting a great circle course, and means for causing said craft to follow said course.

7. In an automatic steering device for ships or other dirigible craft, means for automatically setting a great circle course, and means for causing said craft to follow said course.

8. In an automatic steering device for ships or other passenger carrying dirigible craft, the combination with means for maintaining the ship on a course, hand-operated means for setting a new course, automatic means for setting a new course, and means whereby one of said course-setting means is rendered ineffective when the other of said means is effective.

9. In an automatic steering device for ships or other passenger carrying dirigible craft, the combination with means for maintaining the ship on a course, automatic means normally effective for setting a new course, hand-operated means for setting a new course, and means whereby said automatic means is rendered ineffective when said hand-operated means is rendered effective.

10. In an automatic steering device for dirigible craft, hand-operated means for setting a new course, automatic means for setting a new course, means whereby one of said course-setting means is rendered ineffective when the other of said means is effective, and means whereby both of said course-setting means may be rendered ineffective.

11. In an automatic steering device for dirigible craft, hand-operated means for setting a new course, automatic means for setting a new course, and means whereby one or both of said course-setting means may be rendered ineffective.

12. In an automatic steering device for ships or other passenger carrying dirigible craft, the combination with means for maintaining the ship on a course, of means for setting a new course, means for moving the craft into said course, means for continuously operating said first means to change the course by predetermined increments, and means for adjusting the rate of change of course.

13. In an automatic steering device for dirigible craft, means for setting a new course, means for moving the craft into said course, means for continuously operating said first means, and means for adjusting the change of course in degrees per mile of travel.

14. In an automatic steering device for dirigible craft, means for setting a new course, means for moving the craft into said course, means for continuously operating said first means, means for adjusting the change of course in degrees per mile of travel, and means whereby said first-named means is controlled by the speed of said craft.

15. In an automatic steering device for dirigible craft, means for setting a new course continuously, means for moving the craft into said course, means for adjusting the change of course in degrees per mile of travel, and adjustable means for controlling said first means.

16. In an automatic steering device for ships or other passenger carrying dirigible craft, means for maintaining the ship on its course, means for automatically setting a new course comprising means settable in accordance with the desired change of course per mile, and means for moving the craft into said course.

17. In an automatic steering device for dirigible craft, means for automatically setting a new course comprising means settable in accordance with the desired change of course per mile and means settable in accordance with the speed of the craft, and means for moving the craft into said course.

18. In an automatic steering device for dirigible craft, means for automatically setting a new course comprising means for multiplying desired change of course per unit distance by the distance traveled, and means for moving the craft into said course.

In testimony whereof I have affixed my signature.

OMAR B. WHITAKER.